United States Patent [19]

Sato

[11] Patent Number: 5,305,967
[45] Date of Patent: Apr. 26, 1994

[54] CONTROL MECHANISM FOR BAIT-CASTING REEL

[75] Inventor: Jun Sato, Sakai, Japan

[73] Assignee: Shimano Inc., Osaka, Japan

[21] Appl. No.: 946,159

[22] Filed: Sep. 16, 1992

Related U.S. Application Data

[63] Continuation of Ser. No. 648,514, Jan. 30, 1991, abandoned.

[30] Foreign Application Priority Data

Feb. 6, 1990 [JP] Japan .................... 2-10641[U]

[51] Int. Cl.⁵ .................................................. A01K 89/02
[52] U.S. Cl. .................................. 242/261; 242/262
[58] Field of Search ........................ 242/261, 262, 268

[56] References Cited

U.S. PATENT DOCUMENTS

| | | | |
|---|---|---|---|
| 4,575,024 | 3/1986 | Kaneko | 242/261 |
| 4,593,869 | 6/1986 | Yasui et al. | 242/261 |
| 4,666,101 | 5/1987 | Atobe | 242/261 X |
| 4,674,699 | 6/1987 | Fukushima et al. | 242/261 |
| 4,798,355 | 1/1989 | Kaneko | 242/261 |
| 4,819,893 | 4/1989 | Ueno | 242/261 |
| 4,919,360 | 4/1990 | Roberts | 242/261 X |
| 5,163,635 | 11/1992 | Sato | 242/161 |
| 5,188,312 | 2/1993 | Sato | 242/161 |

FOREIGN PATENT DOCUMENTS 59-192031 10/1984 Japan .

*Primary Examiner*—Daniel P. Stodola
*Assistant Examiner*—William Stryjewski
*Attorney, Agent, or Firm*—Dickstein, Shapiro & Morin

[57] ABSTRACT

A fishing reel having a spool for taking up a line between a pair of side cases, a control member for setting the spool freely rotatable. The control member is so disposed as to move along a path in parallel with inner wall members of the respective side cases. The control member has, at each side end thereof, a holding portion contactable with inner faces of the respective inner wall members.

4 Claims, 5 Drawing Sheets

CONTROL MECHANISM FOR BAIT-CASTING REEL

This application is a continuation of application Ser. No. 07/648,514 filed Jan. 30, 1991, now abandoned.

BACKGROUND OF THE INVENTION

1. Field of the Invention

The present invention relates to a fishing reel, and more particularly to a double-bearing type fishing reel including a spool disposed between a pair of right and left side cases and a control member for setting the spool freely rotatable.

2. Description of the Related Art

A typical conventional fishing reel of the above-described type is disclosed in e.g. a Japanese laid-open patent gazette No. 59-192031. In this reel, the moving path and operational stroke of the control member is determined through an elongated guide slot defined either in an inner face of each side case or in the control member per se.

However, with the above convention, the spool control member is disposed between the right and left side cases. Then, through use for an extended period of time, there tends to occur e.g. looseness in the fixing bolts or distortion of other parts, which in turn varies the predetermined distances between each end face of the control member and the opposing side case, thus rendering the positioning of the control member unstable. The unstable position interferes with smooth operation of the control member.

The primary object of the invention is to overcome the above drawback of the convention by providing an improved fishing reel which can be operated smoothly for an extended period of time because of invariably stable position of the spool control member.

SUMMARY OF THE INVENTION

For accomplishing the above-noted object, a fishing reel according to the invention comprises: a spool for taking up a line between a pair of side cases; a control member for setting the spool freely rotatable; wherein the control member is so disposed as to move along a path in parallel with inner wall members of the respective side cases; the control member having, at each side end thereof, a holding portion contactable with inner faces of the respective inner wall members.

Functions and effects of the above-described construction will now be described.

FIGS. 1 and 5 show one embodiment of the construction. With this construction, if looseness occurs in the fixing bolts for instance to increase the interdistance between the right and left side cases 4 and 5, the holding portions 6A, 6A of the control member 6 will restrict this increase of interdistance. Also, during an operation of the control member 6, the holding portions 6A, 6A come into sliding contact with the side plates 4a, 5a acting as the inner wall members described above, and this sliding contact prevents right-left displacement of the control member 6, thus effectively preventing the distortion problem described above.

In this way, the invention has fully accomplished the intended object of providing an improved fishing reel which can be operated smoothly for an extended period of time because of invariably stable position of the spool control member.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a fishing reel according to the present invention; in which.

DESCRIPTION OF THE PREFERRED EMBODIMENTS

Figure 1:
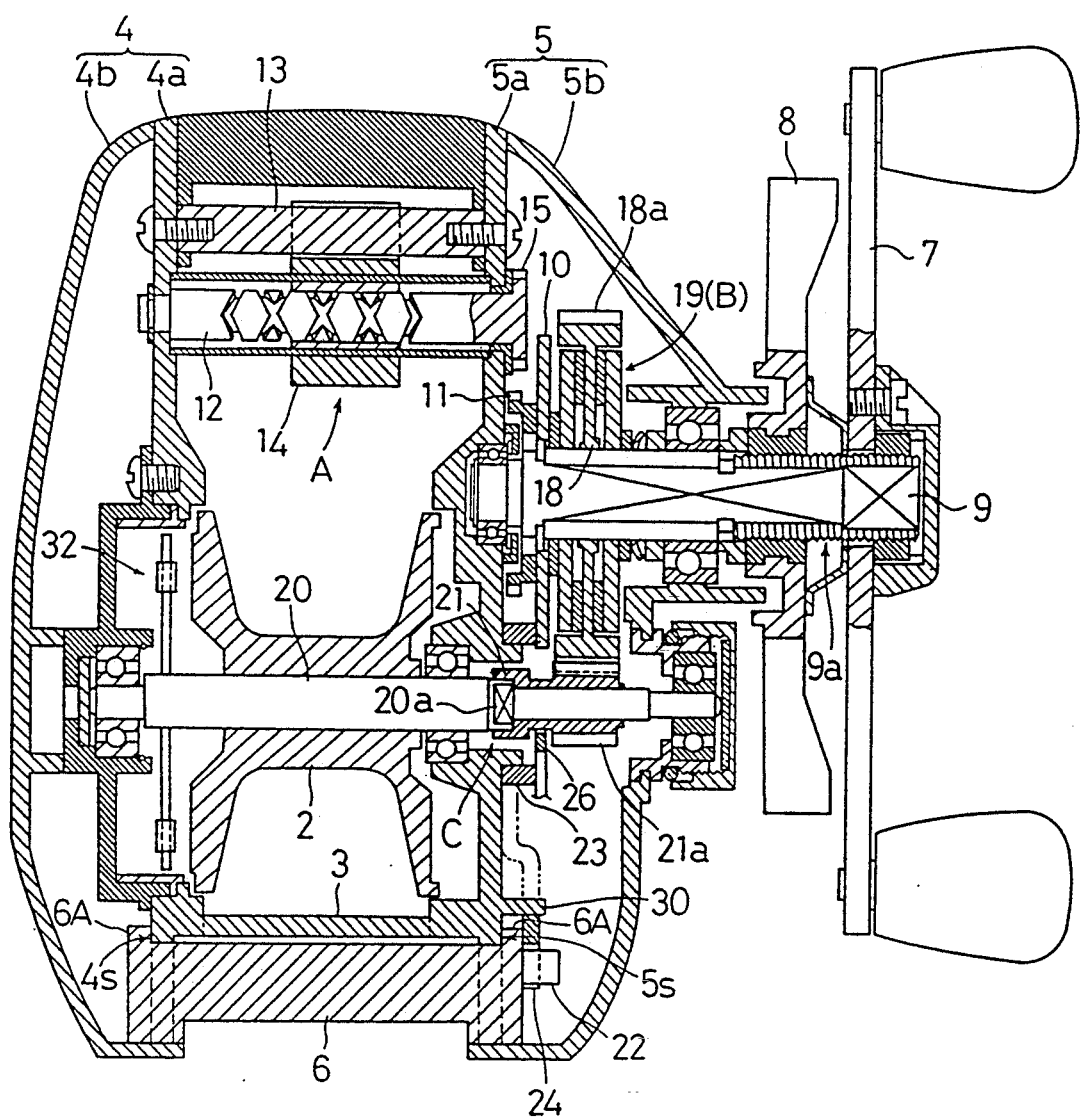
FIG. 1 is a plan view in section of a fishing reel according to one embodiment of the invention.

Preferred embodiments of the present invention will now be described in particular with reference to the accompanying drawings.

FIGS. 1 through 4 show a fishing reel according to one preferred embodiment of the invention. This fishing reel includes a level-wind mechanism A, a spool 2, a thumb rest 3 disposed at front, middle and rear positions respectively in the mentioned order when the reel is attached to an unillustrated fishing rod. Rearwardly of the thumb rest 3, there is provided a control member 6 depressable for setting the spool 2 freely rotatable. The reel further includes a handle 7 and a star-shaped drag adjustment member 8 both disposed on the outer side of the right side case 5.

Figure 2:
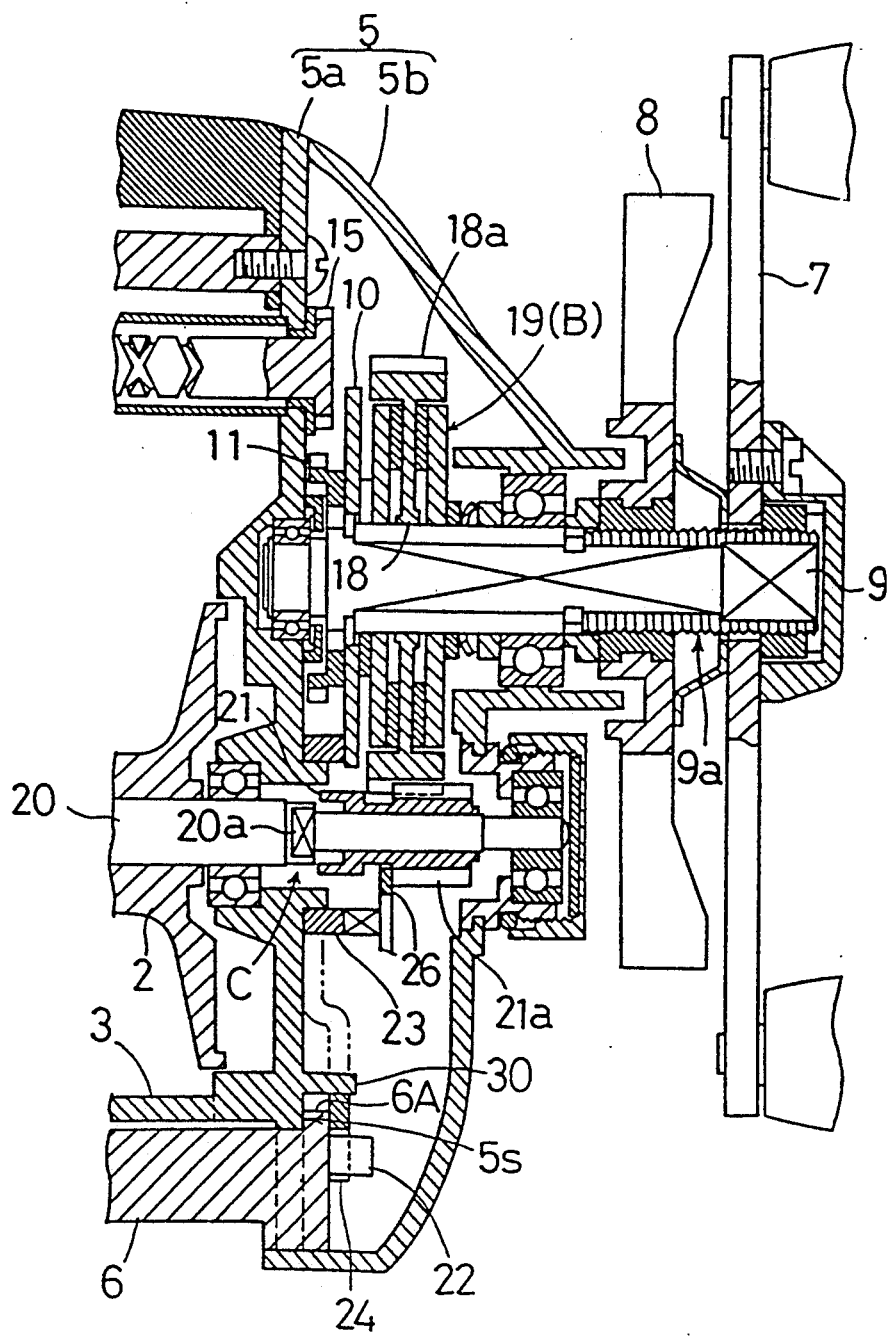
FIG. 2 is a partial section showing the reel where its clutch is actuated for breaking force transmission.

The right and left side cases 4, 5, as shown particularly in FIGS. 1 and 2, respectively include side plates 4a, 5a and outer wall members 4b, 5b for covering the outer faces of the side plates 4a, 5a. Further, a rotary shaft 9 associated with the handle 7 is extended through a gap formed between the inner side plate 5a and the outer wall member 5b.

The aforementioned drag adjustment member 8 is fitted on a threaded portion 9a defined at an outer end of the rotary shaft 9. On the other hand, the rotary shaft 9 mounts, at inner side positions thereof, a drag mechanism B, a ratchet wheel 10 and a transmission gear 11 for transmitting force to the level-wind mechanism A.

The level-wind mechanism A is operable for reciprocating a line/guide member 14 along a guide rod 13 in association with a rotary motion of a spiral shaft 12. The spiral shaft 12 carries, at an end thereof, a gear 15 for transmitting the force from the gear 11 through an intermediate gear 16.

The rachet wheel 10 defines, in its outer periphery, a plurality of radially projecting teeth 10a. Whereas, a claw member 17 is provided adjacent the wheel 10 to be engageable through an urging force with one of the teeth 10a. With these, the rachet wheel 10 functions to prevent reverse rotation of the rotary shaft 9.

The rotary shaft 9 mounts a free disc 18, which disc has an output gear 18a at an outer periphery thereof. And, the aforementioned drag mechanism B includes a plurality of friction plates 19, 19 disposed across this free disc 18 so as to transmit torque to the rotary shaft 9. Accordingly, the drag adjustment member 8, through a rotational operation thereof, adjusts its frictional force through variation of pressure contact between the plates 19, 19 and the disc 18.

The spool 2 includes a spool shaft 20 rotatable in unison therewith. The spool shaft 20 includes an engaging portion 20a at an intermediate portion thereof. Further, this spool shaft 20 loosely mounts a slide member 21 detachably engageable with the engaging portion 20a. This slide member 21 includes an input gear 21a. Then, through meshing between the output gear 18a of the free disc 18 and the input gear 21a of the slide member 21, the slide member 21 engages with the engaging portion 20a. If the handle 7 is manually rotated in this condition, the spool 2 is rotated to take up the line thereabout.

In the course of the above, the level-wind mechanism A functions to level the take-up amount of the line about the spool 2 in the right and left direction. Also, the rachet wheel 10 functions to prevent reverse rotation of the spool 2.

The above-described slide member 21 and the engaging portion 20a together constitute a clutch mechanism C.

Figure 3:
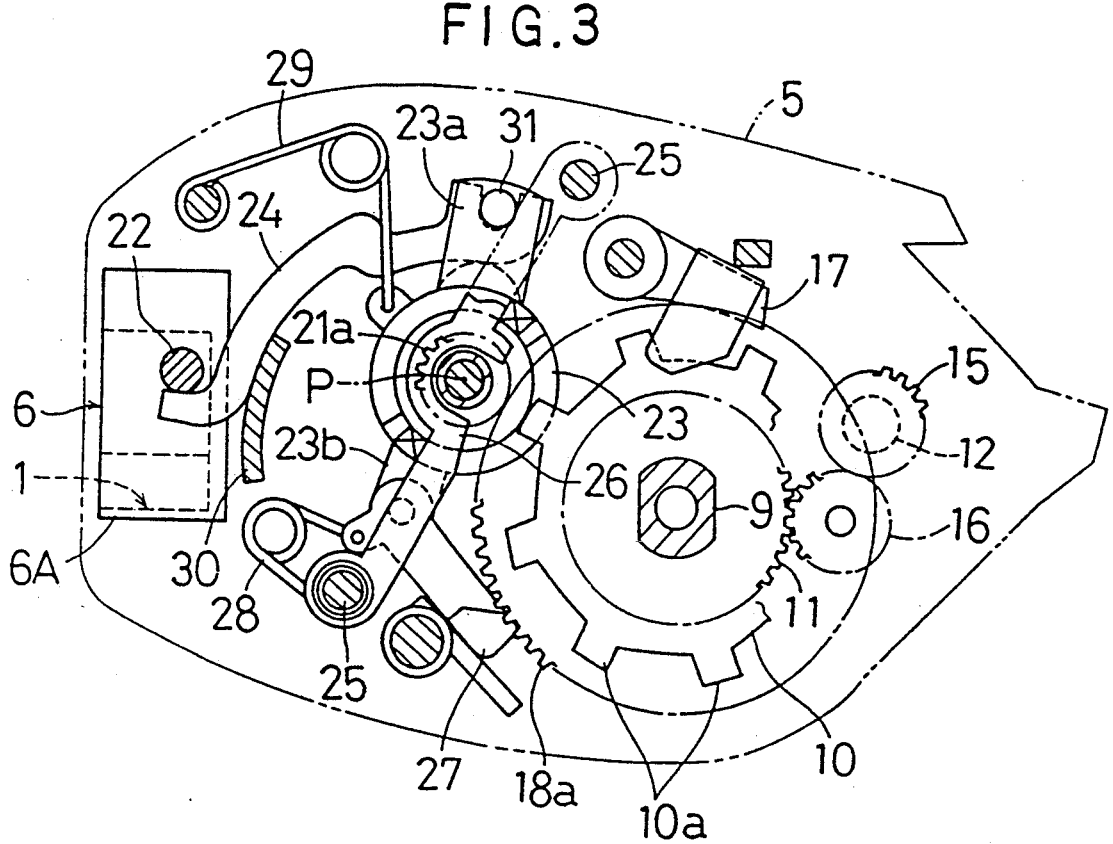
FIG. 3 is a side view showing a control unit of the reel where the clutch remains engaged for force transmission.

For feeding the fish line, the slide member 21 is set at a position shown in FIG. 3, i.e. the position for actuating the clutch mechanism C for breaking the force transmission. Then, the fishing rod is swung. With this, the spool 2 effects a free rotation to feed the line. With the reel of this particular embodiment, the actuation of the clutch mechanism C for setting the spool 2 freely rotatable is effected by depressing the control member 6.

More specifically, in this embodiment, the control member 6 is constructed as a push knob vertically movably supported to the right and left side plates 4a and 5a. Further, a pin 22 projects from a side end of this push knob 6. This pin 22 is operatively connected through an intermediate member 24 with an arm 23a of a ring-shaped cam 23 supported pivotably about the same axis as the axis of the spool shaft 20. The slide member 21 is engaged with a shifter 26 disposed in parallel with the spool shaft 20 and movable along shafts 25 and 25 disposed one above the other. An arm portion 23b of the cam 23 swingably supports a swing element 27. Further, a toggle spring 28 is provided for selectably positioning the swing element 27 between a position engaging with one of the teeth 10a of the ratchet wheel 10 and a further position detached therefrom, depending on the posture of the arm portion 23b. There is provided a further toggle spring 29 for maintaining the clutch C engaged with the ring-shaped cam 23 or disengaged therefrom. Then, if the control member 6 is depressed, the spool 2 is set for free rotation.

Figure 4:
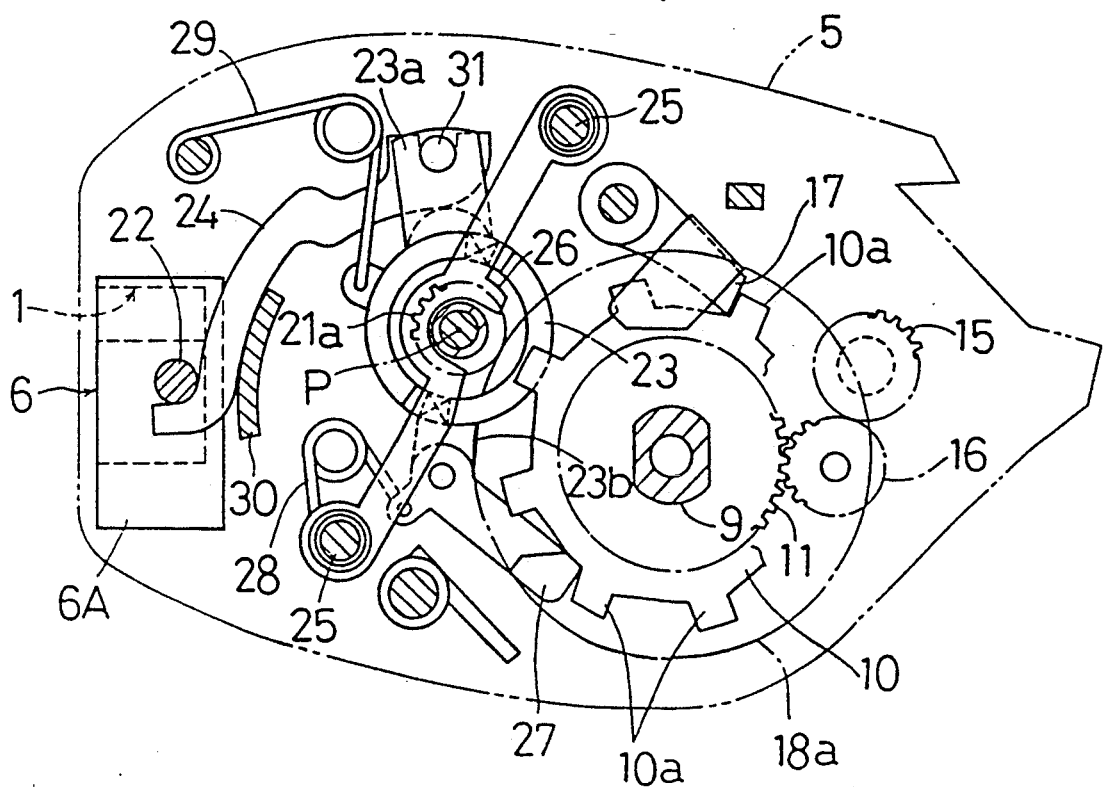
FIG. 4 is a side view showing the control unit where the clutch is actuated for the break of force transmission.

The intermediate member 24, as shown in FIGS. 3 and 4, is configured as an arcuate member and is placed in contact with an arcuate guide member 30 such that the intermediate member 24 moves along an arcuate path centering about an axis displaced from the axis P of the spool shaft 20 when the control member 6 is operated.

One terminal end of this intermediate member 24 is engaged with a pin 31 projecting from the arm 23a of the ring-shaped cam 23. Whereas, the other terminal end of the member 24 is placed in abutment against the pin 22 projecting from the control member 6.

Then, if the handle 7 is rotated when the control member 6 is held at the depressed position, the swing element 27 is pushed backwards through the rotational force of the tooth 10a, thus returning the control member 6 to its home position for again allowing the force transmission.

In the drawings, a reference numeral 32 denotes a centrifugal-force utilizing brake used for preventing a backlash phenomenon associated with a line feeding operation.

Figure 5:
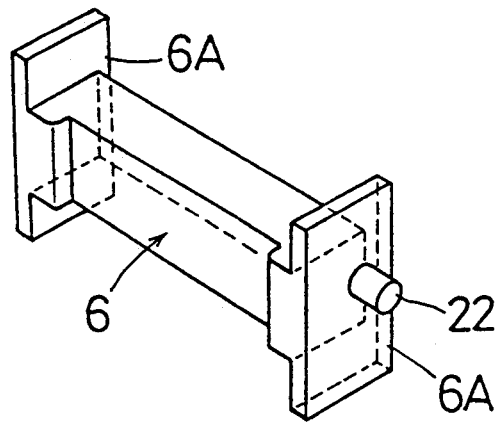
FIG. 5 is a perspective view showing a clutch control member.
Figure 6:
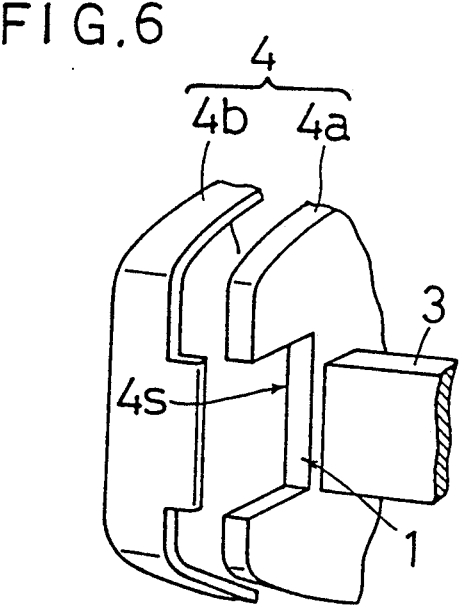
FIG. 6 is a perspective view showing a shape of a guide slot.
Figure 7:
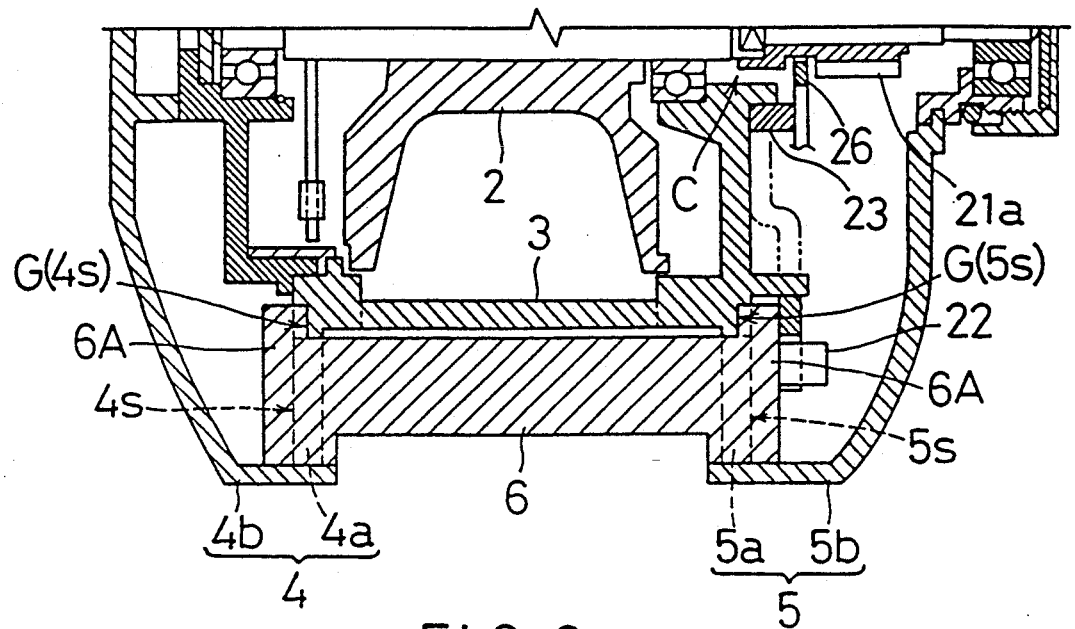
FIG. 7 is a section of a fishing reel according to a further embodiment of the invention.
Figure 8:
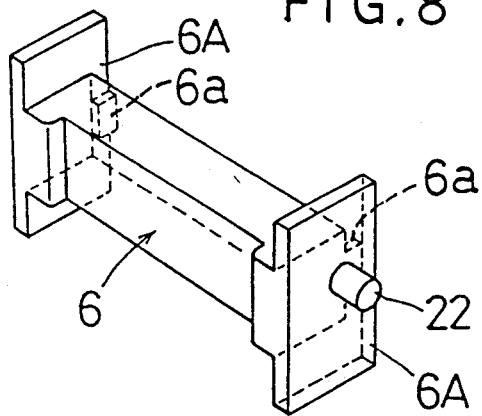
FIG. 8 is a perspective view of a control member of the further embodiment.
Figure 9:
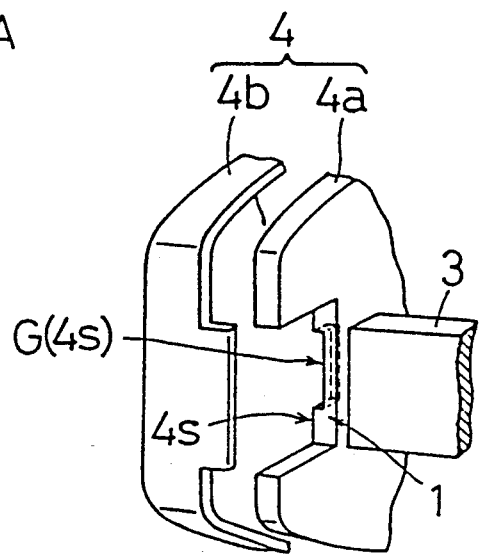
FIG. 9 is a perspective view showing a shape of a guide slot used on the reel of the further embodiment.

Further, with this reel, as shown in FIGS. 5 and 6, opposite ends of the control member 6 are inserted through rectangular guide slots 1, 1 defined respectively in the right and left side plates 4a, 5a so that the operational movement path of the control member 6 extend in parallel with the side cases 4 and 5 and along the vertical direction. More particularly, the control member 6 has, at side ends thereof, holding portions 6A, 6A each projecting vertically like a flange. Then, the control member 6 is inserted through the guide slots 1, 1 of the side plates 4a, 5a such that the holding portions 6A, 6A bind inner faces 4s and 5s of the side plates 4a, 5a (an example of a wall member). This construction can effectively stabilize the posture of the control member 6 during an operation of the same.

Some other embodiments of the present invention will be specifically described.

In addition to the features described above, it is conceivable to form vertically elongated grooves G, G at each rear portion of the side plate 4a, 5a, such that projections 6a, 6a of the holding portions 6A, 6A of the control member 6 fit into these grooves G, G. This is advantageous for further stabilizing the posture of the control member 6.

Further, it is not essential for the present invention to form the holding portions 6A, 6A flange-like. For instance, it is conceivable to configure these holding portions 6A, 6A so that the portions 6A, 6A project only in the forward direction from the control member 6.

Moreover, in embodying the present invention, it is conceivable for the control member 6 to move along a further path in parallel with the right and left wall members and be longitudinally displaceable during an operation of the control member. In this case, the control member 6 provides an arcuate moving path when viewed sidewise. Further, the specific construction of the clutch for setting the spool freely rotatable and the connecting construction between the control member and the clutch can be modified for improvement depending on necessity and convenience.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel comprising:

a handle for providing driving force through a drive mechanism;

a spool for taking up a fishing line in a rearward direction;

a clutch mechanism for controllably coupling said drive mechanism to said spool;

a control member having, at opposite ends thereof, holding portions projecting in forward, upward and downward directions, said forward direction being opposite to said rearward direction, said control member being movable in said upward and downward directions, said holding portions being perpendicular to a line extending through said opposite ends of said control member, said holding portions having opposing inner faces, said control member operating said clutch mechanism to allow said spool to be freely rotatable;

a pair of side cases including outer wall members covering outer peripheries of said side cases, and inner wall members having rear edge portions with rectangular cutouts and having contact faces contacting said inner faces of said holding portions, each outer wall member having a rear edge inner face, said rectangular cutouts having front edges; and guide slots defined by said cutouts and said rear edge inner faces, said inner wall members and outer wall members being in contact with each other;

said control member being mounted between said inner wall members and being longer than the distance between said contact faces of the inner wall members, said opposite ends of the control member being inserted into said guide slots, said inner faces of said holding portions slidably contacting said contact faces of said inner wall members, said holding portions having rear edges slidably contacting said rear edge inner faces of said outer wall members, said control member having front faces adjacent to said holding portions, said front faces slidably contacting said edges of said cutouts, wherein said inner wall members are held by said holding portions of said control member, thereby to prevent a space between said side cases from increasing and also to prevent said control member from being laterally displaced and further to prevent said control member from distorting.

2. A fishing reel as defined in claim 1, wherein said control member carries, at one of said opposite ends, a projecting pin, said pin being connected through an intermediate member with a ring-shaped cam supported pivotally about an axis of said spool.

3. A fishing reel as defined in claim 2, wherein said spool is supported on a spool shaft, wherein said intermediate member is formed arcuate to be guided along an arcuate path extending about an axis displaced from an axis of said spool shaft when said control member is operated.

4. A fishing reel as defined in claim 1, wherein said fishing reel has a top portion, a bottom portion, a front portion and a rear portion, and wherein said guide slots are generally vertical and elongated, and wherein said guide slots are located at rear positions of said side cases, and wherein said holding portions include projections engageable with said guide slots.

* * * * *